United States Patent
Elias et al.

(10) Patent No.: US 10,650,021 B2
(45) Date of Patent: May 12, 2020

(54) MANAGING DATA OPERATIONS IN AN INTEGRATED DATABASE SYSTEM

(71) Applicant: Red Hat, Inc., Raleigh, NC (US)

(72) Inventors: Filip Elias, Vysni Lhoty (CZ); Filip Nguyen, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 324 days.

(21) Appl. No.: 14/095,414

(22) Filed: Dec. 3, 2013

(65) Prior Publication Data

US 2015/0154272 A1    Jun. 4, 2015

(51) Int. Cl.
*G06F 16/27* (2019.01)
*G06F 16/23* (2019.01)

(52) U.S. Cl.
CPC ........ *G06F 16/27* (2019.01); *G06F 16/2308* (2019.01); *G06F 16/2336* (2019.01); *G06F 16/2343* (2019.01)

(58) Field of Classification Search
CPC combination set(s) only.
See application file for complete search history.

(56) References Cited

U.S. PATENT DOCUMENTS

| | | | |
|---|---|---|---|
| 7,231,391 B2 | 6/2007 | Aronoff et al. | |
| 7,962,458 B2 | 6/2011 | Holenstein et al. | |
| 8,341,115 B1 | 12/2012 | Natanzon et al. | |
| 2007/0239797 A1* | 10/2007 | Cattell | G06F 16/217 |
| 2009/0198899 A1* | 8/2009 | Revanuru | G06F 12/0842 711/128 |
| 2012/0191679 A1* | 7/2012 | Takebe | G06F 16/2379 707/703 |
| 2012/0323849 A1 | 12/2012 | Garin et al. | |
| 2014/0081845 A1* | 3/2014 | Lavu | G06Q 40/02 705/39 |
| 2014/0101102 A1* | 4/2014 | Baumgarten | G06F 16/27 707/634 |

OTHER PUBLICATIONS

Das, Sudipto et al. "G-Store: A Scalable Data Store for Transactional Multi Key Access in the Cloud," http://dl.acm.org/citation.cfm?id=1807157, University of California, Santa Barbara, Jun. 10-11, 2010, 12 pages.

Triantafillakis, Aristides et al., "Data Warehouse Clustering on the Web," http://www.sciencedirect.com/science/article/pii/S0377221703006179, European Journal of Operational Research, 1005, pp. 353-364.

Hellerstein, Joseph M. et al., "Bulletin of the Technical Committee on Data Engineering," http://citeseerx.ist.psu.edu/viewdoc/download?doi=10.1.1.35.5331&rep=rep1&type=pdf#page=8, IEEE Computer Society, Jun. 2000 vol. 23 No. 2.

Red Hat Enterprise, "Q Nami!," https://marketplace.redhat.com/rhel/11827-Q-Nami, marketplace.redhat.com.

* cited by examiner

*Primary Examiner* — Shyue Jiunn Hwa
(74) *Attorney, Agent, or Firm* — Lowenstein Sandler LLP

(57) ABSTRACT

A mechanism for managing data operations in an integrated database system. The method includes receiving a request to perform a data operation and retrieving a data set from a primary data source (PDS) in view of the request. The method also includes storing the data set in a temporary data store (TDS). The method further includes performing the data operation on the stored data set in the TDS.

16 Claims, 3 Drawing Sheets

MANAGING DATA OPERATIONS IN AN INTEGRATED DATABASE SYSTEM

TECHNICAL FIELD

The embodiments of the disclosure relate generally to a computer system and, more specifically, relate to managing data operations in an integrated database system.

BACKGROUND

Data integration is an important part of a vendor's middleware portfolio in an enterprise system. Data integration consolidates data from multiple database systems into a single database system while ensuring data validation and enrichment of the data. However, working on large quantities of data with a legacy source code provides challenges, such as bottlenecks near a connection to the single database system. A legacy source code is an original written code that is difficult to modify without breaking other logic in the code. Because the data is primarily consolidated from different database systems, these database systems tend to work on portions of the data that logically ties them to one another. Such data is logically tied to one another due to relationship between the data from different database systems and being linked to same application programs.

Current art utilizes a caching mechanism to overcome the challenges presented when consolidating of large quantities of data. Caching provides a storage space to temporarily store data for future data operations. In the situation when many database systems are integrated, current caching mechanisms do not sufficiently solve the problem because these large quantities of data are being used by different parts of the integrated system. Also, the size of the cache in the current caching mechanism limits the amount of data for storage.

BRIEF DESCRIPTION OF THE DRAWINGS

The disclosure is understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Embodiments of the disclosure are directed to managing data operations in an integrated database system. Embodiments of the disclosure manage data operations based on a request to perform a data operation. The request may include an identifier to connect to a primary data source (PDS), a query identifying location of a data set stored in the PDS associated with the data operation, and a lock mode to lock the data set in the PDS in order to perform the data operation on the data set. The data operation may include, but is not limited to, an instruction to select data, read data, write data, create data, delete data or modify data on the data set stored in the PDS.

A method of one embodiment includes receiving a request to perform a data operation. The method also includes retrieving a data set from a PDS in view of the request. The method also includes storing the data set in a temporary data store (TDS). The method further includes performing the data operation on the stored data set in the TDS.

Prior solutions for managing data operations in an integrated database system present several disadvantages. The integrated database system is a consolidation of data retrieved from many different database systems. Each of these different database systems store large quantities of data. Even though prior caching mechanisms provide a storage space to temporarily store the data from different database systems, they do not provide flexibility with regard to large quantities of data and do not take into consideration that these large quantities of data are being used by different parts of logics in the database systems. Further, prior caching mechanism does not provide a solution to reduce the bottleneck between the different database systems and the integrated database system. Embodiments of the disclosure overcome these disadvantages by copying the data set from the PDS into a TDS and performing a data operation on the stored data set in the TDS, which is further replicated from the TDS into the PDS.

Figure 1:
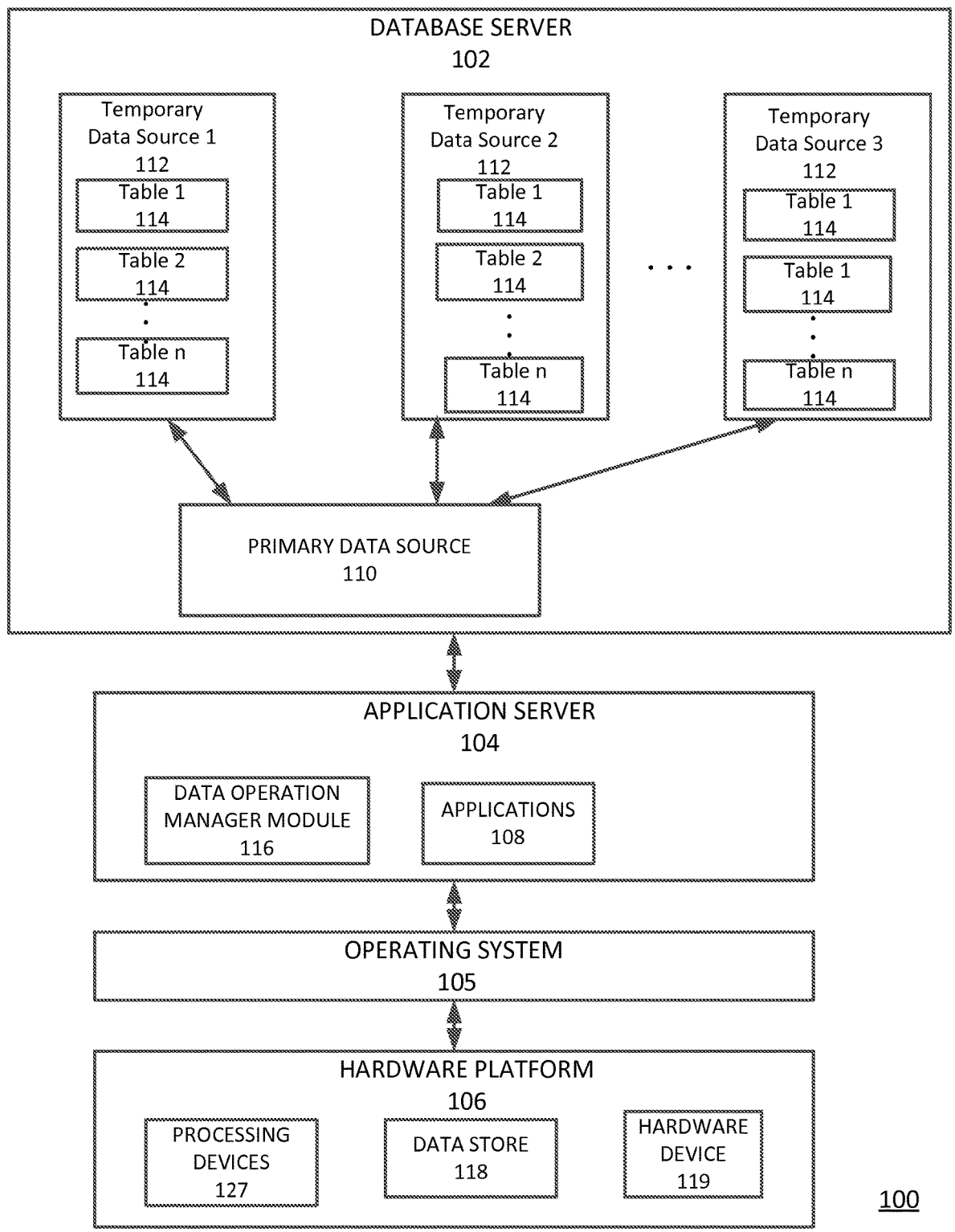
FIG. 1 is a block diagram of a computer system in which the embodiments of the present disclosure may operate.

FIG. 1 illustrates a block diagram of a computer system 100 in which embodiments of the present invention may be implemented. In one embodiment, the computer system 100 may be a machine such as, for example, any variety of user devices, such as a personal computer (PC), a laptop, a mobile phone, mobile smart phone, a tablet computer, handheld devices, netbooks, or any other computing device. Furthermore, computer system 100 may comprise a server device, such as a main frame server device or any other type of server device. The computer system 100 comprises a database server 102, an application server (AS) 104, a hardware platform 106, on top of which runs an operating system (OS) 105. The AS 104 is a server that provides services to execute enterprise applications. The OS 105 may include Microsoft®, Linux®, Solaris®, Mac® OS or any other suitable OS for managing operations on the computer system 100.

The hardware platform 106 may include one or more processing devices 117 and a data store 118. In one embodiment, the data store 118 comprises one or more hardware or software devices, which may be located internally or externally to the computer system 100. Examples of data store 118 may include, but are not limited to, random-access memory (RAM), non-volatile storage memory (e.g., Flash, EEPROM, solid state drives (SSD), etc.), magnetic storage memory (e.g., one or more hard drives), and optical memory (e.g., PDS, DVD, BlueRay drives, etc.). In addition, hardware platform 106 may include additional hardware devices 119, such as network interface cards (NICs), sound or video adaptors, photo/video cameras, printer devices, keyboards, displays or any other suitable device intended to be coupled to a computer system.

In one embodiment, the database server 102 includes a primary data source (PDS) 110 for storing data. In one embodiment, the PDS 110 is a clustered data source having a set of data clustered in various groups such that data in each group is replicated to each other. In one implementation, the PDS 110 is a relational database management system. In another implementation, the PDS 110 is a file system.

In one embodiment, the database server 102 includes a plurality of temporary data sources (TDSs) 112 for temporarily storing data selected for replication from the PDS 110.

In one embodiment, the TDS 112 is a relational database management system (RDBMS), where the data is stored as database objects called tables 114. A table is a collection of related data items and it includes columns and rows. In one embodiment, the rows include each individual data item that exists in the table. The columns may include all information associated with a specific field in a table. For example, a column in a CUSTOMER table may be ADDRESS, which represents a location description of the customer.

In one embodiment, the TDS 112 is a collection of the data items organized as a schema of the tables 114 from which the data may be accessible. Each of the TDSs 112 may include 'n' number of tables 114, with each table 114 having its own primary key. In one embodiment, the primary key uniquely defines a relationship of the table 114 within the TDS 112. The primary key may uniquely identify each of the rows in the table 114.

The data in the table 114 of the 'n' tables in the TDS 112 may include, but is not limited to, customer data, address data, product data, vendor data, price data and order data. The customer data may include columns having key, name, surname, and address_key. The address data may include columns having key, street and city. The product data may include columns having key, name, buyer_customer_key. The vendor data may include columns having key, vendor name, product_customer_key. The price data may include columns having key, price, product_customer_key. The order data may include columns having key, order, product_customer_key.

The AS 104 may include one or more software application programs 108 (i.e. applications). The applications 108 may be any computer-executable program capable of communicating with the AS 104. The AS 104 may also include a data operation manager (DOM) module 116 to manage data operations in an integrated database system. In one embodiment, the data operations are transactions to be executed on a data set stored in the PDS 110. In one embodiment, the transactions are sequence of standard query language (SQL) statements. The data operations may include, but are not limited to, an instruction for selecting the data set, reading the data set, writing the data set, creating the data, deleting the data set, or modifying the data set stored in the PDS 110.

In one embodiment, the DOM 116 receives a request to perform the data operation. The DOM 116 may receive the request from a client. The client may be a user of the computer system 100. The client may be another device communicably coupled to the computer system 100.

In one embodiment, the request includes implementation of a lock mode. The lock mode defines an action taken to lock the data set in the PDS 110 between the time it is read and the time that it is used. The lock mode may be one of a pessimistic lock mode or an optimistic lock mode. In the pessimistic lock mode, it is assumed that concurrent data operations conflict with each other and, as such, data sources are locked after they are read and unlocked after the data operation has finished using data in the data sources. The pessimistic lock mode prevents any type of data operation to be performed on the data set in the PDS 110 during execution of another data operation. As an example, assume that a first data operation is modifying the data set from the PDS 110 and a second data operation seeks to modify the same data set from the PDS 110 at the same time. In this situation, the data set in the PDS 110 is locked in order to prevent access by the second data operation to the data set until the first data operation has completed modifying the data set.

In another embodiment, the optimistic lock mode allows multiple data operations to be performed without conflicting with each other, and that therefore data operations may proceed without locking the data resources. As such, the optimistic lock mode may allow multiple data operations to be performed on the data set in the PDS 110 simultaneously.

In one embodiment, the optimistic lock mode prevents some types of data operations to be performed on the data set in the PDS 110 during or after execution of another data operation. Some types of the data operations may include, but are not limited to, reading the data set, modifying the data set or deleting the data set in the PDS 110. In such situations, the data operations conflict with each other and require data sources to be locked after they are read and unlocked after data operation has finished using data in the data sources. As an example, the current data operations may include adding content to the data set when the content has already been added to the data set.

In one embodiment, the request includes an identifier that identifies a name of a data source (ds) connection to access the PDS 110 associated with the data operation. The identifier may be a data source Java™ Naming and Directory (dsJndi) identifier. In one embodiment, the request includes a query. A query is a code written in form of a query statement and then executed against a database. The query may select the data set stored in the PDS 110 to perform the data operation. In one embodiment, the query provides location of the data set stored in the PDS 110. In one embodiment, the query is a structured query language (SQL) query. An SQL is a special-purpose programming language designed for managing data held in a RDBMS. In one embodiment, the PDS 110 stores data in form of the RDBMS format. As such, the query may provide the primary key in the query statement.

In one embodiment, the DOM module 116 makes a connection with the PDS 110 upon receipt of the request to perform the data operation. The DOM module 116 may connect with the PDS 110 using the identifier in the request. In one embodiment, the DOM module 116 retrieves the data set from the PDS 110. In one embodiment, the DOM module 116 may retrieve the data set from the PDS 110 using the query in the request. The DOM module 116 may retrieve a whole row of data from the PDS 110 identified by the primary key in the query. In one embodiment, the DOM module 116 selects a TDS 112 among the plurality of TDSs. For example, the DOM module 116 may select a TDS 112 that has not yet been used in any transaction. In another example, the DOM module 116 may select a TDS 112 that is available to execute transactions.

In one embodiment, the DOM module 116 stores the retrieved data set from the PDS 110 into the selected TDS 112. Specifically, the data set on which the data operation is to be executed is replicated from the PDS 110 into the selected TDS 112.

In one embodiment, the DOM module 116 locks the data set in the PDS 110. The DOM module 116 locks the data set based on the lock mode in the request. As discussed above, the lock mode defines an action taken to lock the data set in the PDS 110 between the time it is read and the time that it is used. Also as discussed above, the lock mode may be a pessimistic lock mode, which prevents any type of data operations to be performed on the data set during execution of another data operation. Also, as discussed above, the lock mode may be an optimistic lock mode, which may allow for various types of data operations to be performed on the data set during execution of the another data operation. Further as discussed above, the optimistic mode may prevent some types of data operations to be performed on the data set during or after execution of another data operation. In one embodiment, the DOM module 116 performs the data operation in the data set stored in the selected TDS 112.

In one embodiment, when the lock mode is in a pessimistic lock mode, the DOM module 116 commits to the data operation in the selected TDS 112. As such, any changes or updates that occurred in the data set due to the data operation will be made permanent. In one embodiment, the DOM module 116 releases the data set locked in the pessimistic lock mode in the PDS 110. As such, the data set in the PDS 110 is now unlocked and available for other data operations. In one embodiment, the DOM module 116 performs reverse data replication. As such, the DOM module 116 may replicate the operated data set from the selected TDS 112 into the PDS 110. The DOM module 116 may use the primary key provided in the query to identify the rows in the PDS 110 into which to insert the replicated data-operated data set. In one embodiment, the DOM module merges the changes or the updates from the operated data set in the selected TDS 112 into the PDS 110. In one embodiment, the DOM module 116 releases the selected TDS 112. As such, the DOM module 116 deletes the data set stored in selected TDS 112.

In one embodiment, when the lock mode is in an optimistic lock mode, the DOM module 116 checks to verify that no other data operation has modified the data set in the PDS 110.

In one embodiment, the DOM module 116 commits to the data operation in the selected TDS 112 when no other data operation has modified the data set in the PDS 110. As such, any changes or updates that occurred in the data set due to the data operation will be made permanent. In one embodiment, the DOM module 116 performs reverse data replication. The DOM module 116 may replicate the operated data set from the selected TDS 112 into the PDS 110. The DOM module 116 may use the primary key provided in the query to identify the rows in the PDS 110 into which to insert the replicated data-operated data set. In one embodiment, the DOM module merges the changes or updates from the data-operated data set in the selected TDS 112 into the PDS 110. In one embodiment, the DOM module 116 releases the selected TDS 112. As such, the TDS 112 is available to perform other data operations. In one embodiment, the DOM module 112 releases the TDS after the performing of the reverse data replication. As such, the DOM module 116 deletes the operated data set in the selected TDS 112.

In one embodiment, the DOM module 116 rolls back the data operation on the data set stored in the selected TDS 112 when another data operation has modified the data set in the PDS 110. The DOM module 116 may roll back the data operation by aborting the data operation in the request.

In one embodiment, the DOM module 116 releases the selected TDS 112. As such, the TDS 112 is available to perform other data operations. As such, the DOM module 116 deletes the operated data set in the selected TDS. In another embodiment, the DOM module 112 releases the TDS after the roll back of the data operation on the data set stored in the selected TDS 112. As such, the DOM module 116 deletes the data set stored in selected TDS 112.

Figure 2:
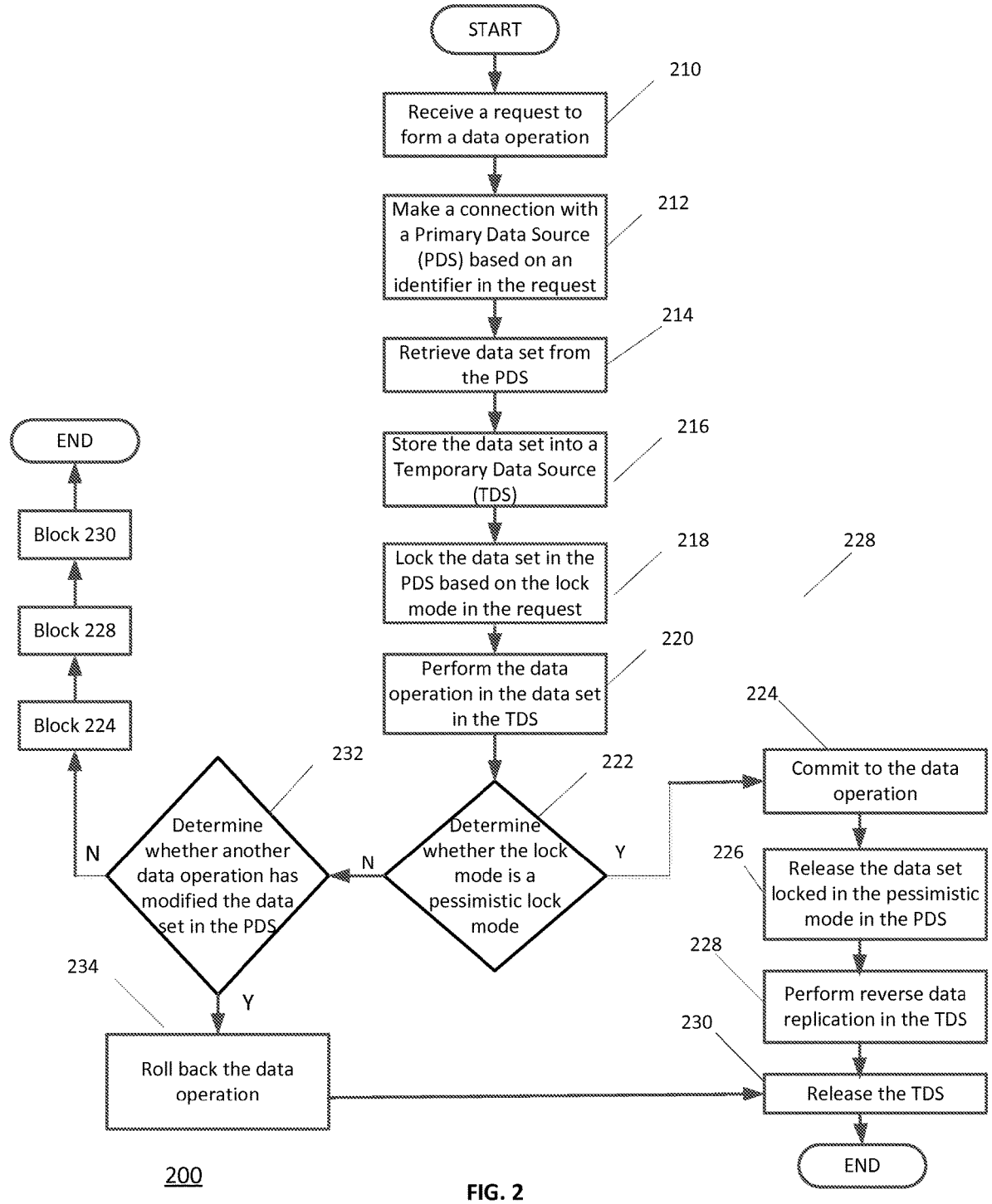
FIG. 2 illustrates a flow diagram of one embodiment of a method for managing data operations in an integration of database systems.

FIG. 2 is a flow diagram illustrating a method 200 for managing data operations in an integrated database system according to an embodiment of the disclosure. Method 200 may be performed by processing logic that may comprise hardware (e.g., circuitry, dedicated logic, programmable logic, microcode, etc.), software (such as instructions run on a processing device), firmware, or a combination thereof. In one embodiment, method 200 is performed by DOM module 116 of FIG. 1 executing in a computing device, such as the computer system 100 of FIG. 1.

Referring to FIG. 2, method 200 begins at block 210 where a request to perform a data operation is received at the OS 104. In one embodiment, the request includes a lock mode. As discussed above, the lock mode defines an action taken to lock the data set in the PDS 110 between the time it is read and the time that it is used. Also as discussed above, the lock mode may be one of a pessimistic lock mode or an optimistic lock mode. In one embodiment, the request includes an identifier that identifies a name of a data source connection to access the PDS 110 associated with the data operation. The request may also include a query that selects the data set stored in the PDS 110 to perform the data operation. As discussed above, the query may provide location of the data set stored in the PDS 110 and a primary key in the query statement.

At block 212, the DOM module 116 makes a connection with the PDS 110. The DOM module 116 may connect with the PDS 110 using the identifier in the request. At block 214, the DOM module 116 retrieves the data set from the PDS 110. The DOM module 116 may retrieve the data set from the PDS 110 using the query in the request. In one embodiment, the DOM module 116 may retrieve a whole row of data from the PDS 110 identified by the primary key in the query. At block 216, the DOM module 116 stores the retrieved data set from the PDS 110 into the TDS 112. In one embodiment, the DOM module 116 selects the TDS 112 from among a plurality of TDSs to store the retrieved data set. The DOM module 116 may select the TDS 112 that has not yet been used in any transaction. The DOM module 116 may also select the TDS 112 that is available to execute transactions.

At block 218, the DOM module 116 locks the data set in the PDS 110. The DOM module 116 locks the data set based on the lock mode in the request. In one embodiment, the lock mode is an optimistic lock mode. As discussed above, the optimistic lock mode may allow for various types of data operations to be performed on the data set during execution of another data operation. Also as discussed above, the optimistic mode may prevent some types of data operations to be performed on the data set during or after execution of another data operation. At block 220, the DOM module 116 performs the data operation on the data set stored in the TDS 112 At decision block 222, the DOM module 116 determines whether the lock mode is a pessimistic lock mode.

At block 224, the DOM module 116 commits to the data operation in the TDS 112 when it is determined at block 222 that the lock mode is a pessimistic lock mode. As such, any changes or updates that occurred in the data set in the TDS 112 due to the data operation will be made permanent. At block 226, the DOM module 116 releases the data set locked in the pessimistic lock mode in the PDS 110. As such, the data set in the PDS 110 is now unlocked and available for other data operations. At block 228, the DOM module 116 performs reverse data replication in the TDS 112. The DOM module 116 may replicate the operated data set from the selected TDS 112 into the PDS 110. The DOM module 116 may use the primary key provided in the query to identify the rows in the PDS 110 into which to insert the replicated data-operated data set. In one embodiment, the DOM module merges the changes or the updates from the data-operated data set in the selected TDS 112 into the PDS 110. At block 230, the DOM module 116 releases the selected TDS 112. As such, the DOM module 116 deletes the data set stored in selected TDS 112.

At a decision block 232, the DOM module 116 determines whether another data operation has modified the data set in the PDS 110 when it is determined at the decision block 222 that the lock mode is not in the pessimistic lock mode. In one embodiment, when the lock mode is not in pessimistic mode, it is in the optimistic lock mode.

At block 234, the DOM module 116 rolls back the data operation when it is determined at the decision block 232 that another data operation has modified the data set in the PDS 110. In one embodiment, the DOM module 116 rolls back the data operation by aborting the data operation. The DOM module 116 repeats block 230. the DOM module 116 repeats block 224 when it is determined at the decision block 232 that another data operation has not modified the data set in the PDS 110. The DOM module 116 then repeats blocks 228 and 230.

Figure 3:
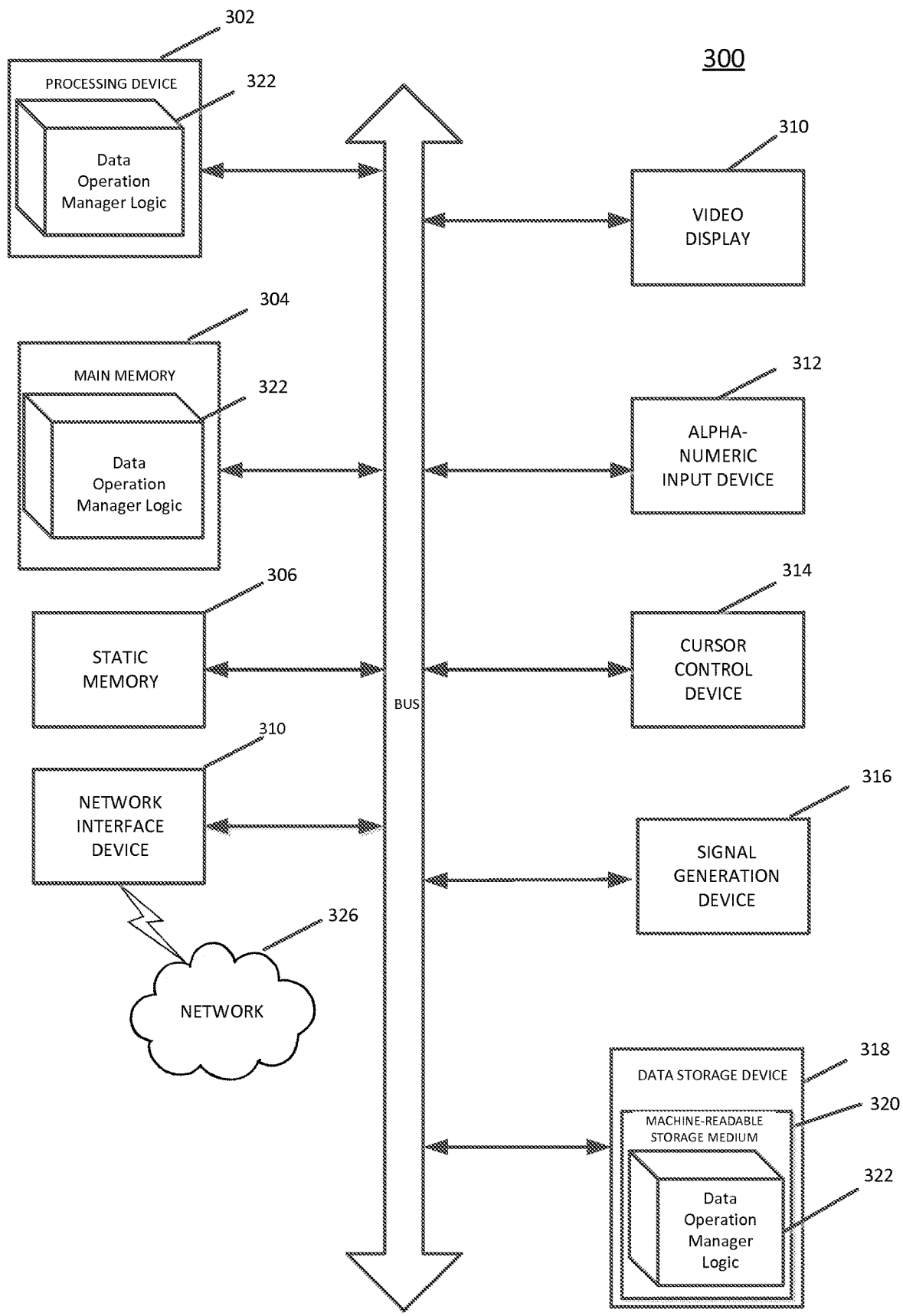
FIG. 3 illustrates a block diagram of one embodiment of a computer system.

FIG. 3 illustrates a diagrammatic representation of a machine in the example form of a computer system 300 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 includes a processing device 302, a memory 304 (e.g., read-only memory (ROM), flash memory, dynamic random access memory (DRAM) (such as synchronous DRAM (SDRAM) or Rambus DRAM (RDRAM), etc.), a static memory 306 (e.g., flash memory, static random access memory (SRAM), etc.), and a data storage device 318, which communicate with each other via a bus 330.

Processing device 302 represents one or more general-purpose processing devices such as a microprocessor, central processing unit, or the like. More particularly, the processing device may be complex instruction set computing (CISC) microprocessor, reduced instruction set computer (RISC) microprocessor, long instruction word (VLIW) microprocessor, or processor implementing other instruction sets, or processors implementing a combination of instruction sets. Processing device 302 may also be one or more special-purpose processing devices such as an application specific integrated circuit (ASIC), a field programmable gate array (FPGA), a digital signal processor (DSP), network processor, or the like. The processing device 302 is configured to execute data operation manager logic 322 for performing the data operations and steps discussed herein. In one embodiment, data operation manger module 116 described with respect to FIG. 1 performs the data operation manager logic 322.

The computer system 300 may further include a network interface device 308. The computer system 300 also may include a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 316 (e.g., a speaker).

The data storage device 318 may include a machine-accessible storage medium (or more specifically a computer-readable storage medium) 320 on which is stored one or more sets of instructions (e.g. data operation manager logic 322) embodying any one or more of the methodologies of functions described herein, such as method 200 for managing data operations in an integrated database systems described with respect to FIG. 2. The data operation manager logic 322 may also reside, completely or at least partially, within the memory 306 and/or within the processing device 302 during execution thereof by the computer system 300; the memory 306 and the processing device 302 constituting machine-accessible storage media. In one embodiment, data operation manager logic 322 is the same as data operation manager module 116 of FIG. 1.

The machine-readable storage medium 320 may also be used to store the data operation manager processing logic 322 persistently containing methods that call the above applications. While the machine-readable storage medium 320 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It should be apparent, however, that the disclosure may be practiced without these specific details. In some instances, structures and devices are shown in block diagram form, rather than in detail, in order to avoid obscuring the disclosure.

Some portions of the detailed descriptions, which follow, are presented in terms of algorithms and symbolic representations of operations on data bits within a computer memory. These algorithmic descriptions and representations are the means used by those well known in the data processing arts to most effectively convey the substance of their work to others well known in the art. An algorithm is here, and generally, conceived to be a self-consistent sequence of steps leading to a desired result. The steps are those requiring physical manipulations of physical quantities. Usually, though not typically, these quantities take the form of electrical or magnetic signals capable of being stored, transferred, combined, compared, and otherwise manipulated. It has proven convenient at times, typically for reasons of common usage, to refer to these signals as bits, values, elements, symbols, characters, terms, numbers, or the like.

It should be borne in mind, however that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", 'storing", "saving", "collecting", "obtaining", "determining", "executing", "performing", "deleting" "selecting" "retrieving", "replicating", "locking", "unlocking" or the like, refer to the action and processes of a computer system, or similar electronic computing device that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be constructed for the specific purposes, or it may comprise a general-purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems may be used with programs in accordance with the teachings herein, or it may prove convenient to construct an apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

It is to be understood that the above description is intended to be illustrative, and not restrictive. Many other embodiments will be apparent to those well known in the art upon reading and understanding the above description. Although the disclosure has been described with reference to specific examples of embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
   receiving a request to perform a database operation on a primary database, the request comprising a database query;
   selecting, by the processing device, a temporary database from a plurality of temporary relational databases in view of an availability of the temporary relational databases to execute transactions;
   locking, by a processing device, a data set of the primary database in view of the request, wherein the locking comprises a pessimistic lock mode or an optimistic lock mode;
   storing the data set in the selected temporary database, wherein the selected temporary database comprises a plurality of rows and columns;
   causing the database operation to execute on the selected temporary database to modify a portion of the data set in the selected temporary database;
   identifying, in view of a key of the database query, a row and a column of the selected temporary database that comprise the modified portion of the data set;
   replicating, by the processing device, the modified portion of the data set from the row and the column of the selected temporary database into the primary database;
   deleting the data set in the selected temporary database; and
   unlocking the data set in the primary database.

2. The method of claim 1 wherein the request comprises a lock mode.

3. The method of claim 2, wherein the lock mode indicates the pessimistic lock mode or the optimistic lock mode.

4. The method of claim 1, wherein the unlocking comprises unlocking the data set in the primary database after deleting the data set in the selected temporary database.

5. The method of claim 1 wherein the database operation comprising one of selecting data, reading data, writing data, creating data, deleting data or modifying data on the stored data set in the selected temporary database.

6. The method of claim 1 further comprising merging the data set of the selected temporary database into the data set of the primary database.

7. The method of claim 1 wherein the selecting comprises selecting the temporary database from the plurality of temporary relational databases in view of an availability of each of the plurality of temporary relational databases.

8. A system comprising:
   a memory;
   a processing device, operatively coupled to the memory, to:
   receive a request to perform a database operation on a primary database, the request comprising a database query;
   select a temporary database from a plurality of temporary relational databases in view of an availability of the temporary relational databases to execute transactions;
   lock a data set of the primary database in view of the request, wherein the lock comprises a pessimistic lock or an optimistic lock;
   store the data set in the selected temporary database, wherein the selected temporary database comprises a plurality of rows and columns;
   cause the database operation to execute on the selected temporary database to modify a portion of the data set in the selected temporary database;
   identify, in view of a key of the database query, a row and a column of the selected temporary database that comprise the modified portion of the data set;
   replicate the modified portion of the data set from the row and the column of the selected temporary database into the primary database;
   delete the data set in the selected temporary database; and
   unlock the data set in the primary database.

9. The system of claim 8 wherein the request comprising a lock mode.

10. The system of claim 9 wherein the lock mode is at least one of a pessimistic lock mode or an optimistic lock mode.

11. The system of claim 8 wherein to unlock the data set the processing device is to unlock the locked data set in the primary database after deleting the data set in the selected temporary database.

12. A non-transitory machine-readable storage medium comprising data, when accessed by a processing device, cause the processing device to:
 receive a request to perform a database operation on a primary database, the request comprising a database query;
 select a temporary database from a plurality of temporary relational databases in view of an availability of the plurality of temporary relational databases to execute transactions;
 lock a data set of the primary database in view of the request wherein the locking comprises a pessimistic lock or an optimistic lock;
 store the data set in the selected temporary database, wherein the selected temporary database comprises a plurality of rows and columns;
 cause the database operation to execute on the selected temporary database to modify a portion of the data set in the selected temporary database;
 identify, in view of a key of the database query, a row and a column of the selected temporary database that comprise the modified portion of the data set;
 replicate, by the processing device, the modified portion of the data set from the row and the column of the selected temporary database into the primary database;
 delete the data set in the selected temporary database; and
 unlocking the data set in the primary database.

13. The non-transitory machine-readable storage medium of claim 12 wherein the request comprises a lock mode.

14. The non-transitory machine-readable storage medium of claim 13 wherein the lock mode is at least one of a pessimistic lock mode or an optimistic lock mode.

15. The non-transitory machine-readable storage medium of claim 12 wherein the processing device to lock the data set in the primary database in view of a lock mode in the request.

16. The non-transitory machine-readable storage medium of claim 15 wherein the processing device to unlock the locked data set in the primary database after deleting the data set in the selected temporary database.

\* \* \* \* \*